Feb. 16, 1937.  E. F. SAVAGE  2,071,044
METHOD AND APPARATUS FOR MOTION PICTURE
VISUAL ACCOMPANIMENTS TO MUSICAL SCORES
Filed March 3, 1934  3 Sheets-Sheet 2
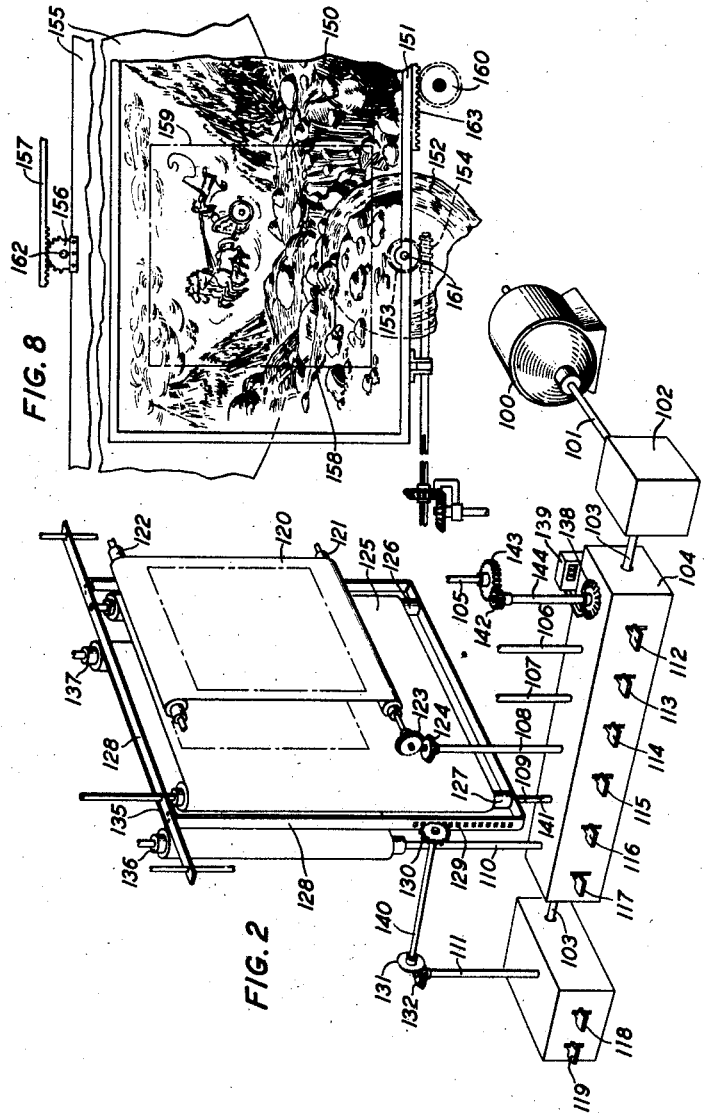
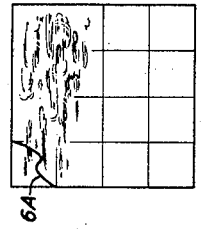
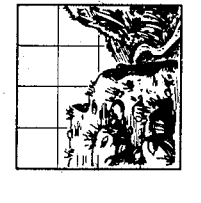
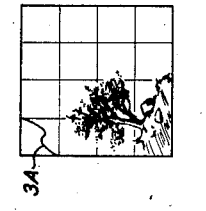
INVENTOR
E. F. SAVAGE
BY
*G. H. Heydt.*
ATTORNEY Feb. 16, 1937.  E. F. SAVAGE  2,071,044
METHOD AND APPARATUS FOR MOTION PICTURE
VISUAL ACCOMPANIMENTS TO MUSICAL SCORES
Filed March 3, 1934   3 Sheets-Sheet 3
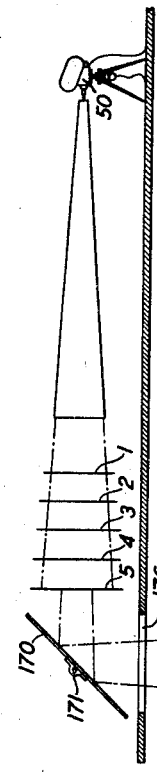
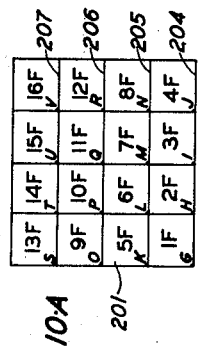
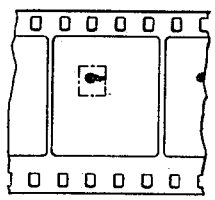
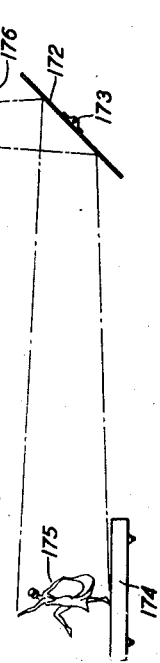
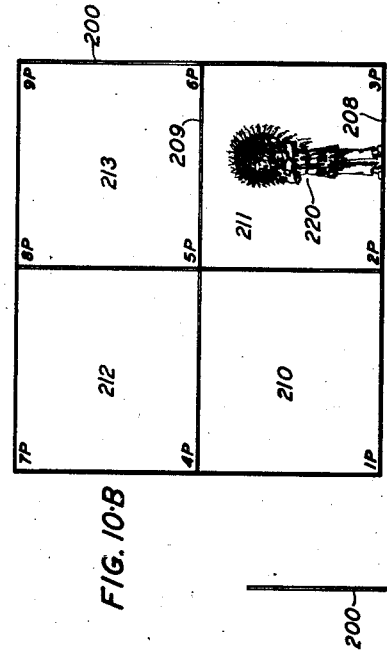
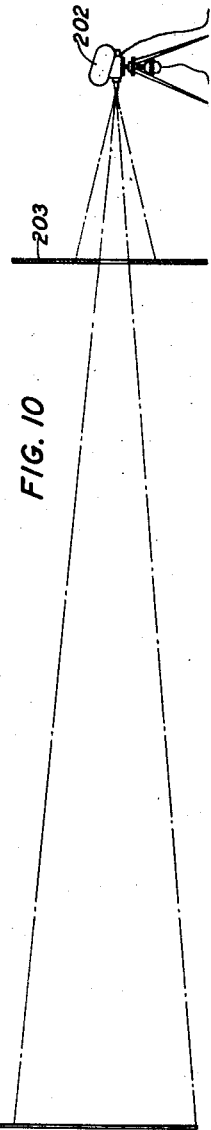
INVENTOR
E. F. SAVAGE
BY
G. H. Heydt
ATTORNEY Patented Feb. 16, 1937

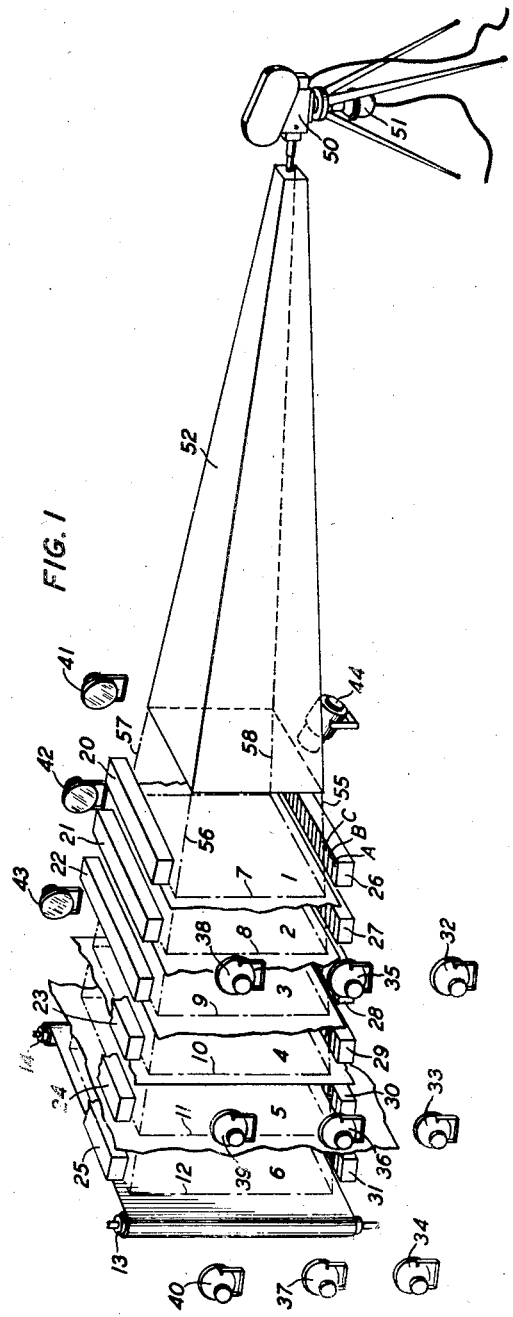

2,071,044

UNITED STATES PATENT OFFICE 2,071,044

METHOD AND APPARATUS FOR MOTION PICTURE VISUAL ACCOMPANIMENTS TO MUSICAL SCORES

Eugene F. Savage, Ossining, N. Y., assignor, by mesne assignments, to Western Electric Company, Incorporated, a corporation of New York Application March 3, 1934, Serial No. 713,811

23 Claims. (Cl. 88—16)

This invention relates to a method and means for producing motion pictures as a visual accompaniment or interpretation of music and particularly to the preparation and organization of portrayals for producing the pictorial visual accompaniment.

It has been found that the number of people who have appreciation of interpretative music in the form of realistic, romantic and impressionistic musical compositions is very large. Because of this general appreciation and to further educate the people, the time given over to this character of music is steadily increasing. In a large number of such programs the music is accompanied by a verbal description of visionary scenes represented by the different elements of musical scores. This character of music is, however, used very little as part of the programs in moving picture theaters. This is probably due to the absence of an economical structure or arrangement for producing a visionary scene as an accompaniment for musical scores. The invention presented herein provides this economical structure or arrangement for producing a fascinating visual accompaniment for interpretative music in the form of motion pictures, setting forth constantly changing descriptive scenic effects and action based on the musical scores.

Various characteristics have heretofore been produced in the form of moving pictures made from a series of portrayals or combinations thereof with accompanying music. Insofar as is known, the music for such characterizations is prepared as an accompaniment for the pictures and synchronized with the motion exhibited in the pictures. This is also true in motion pictures made from natural scenes. In each case the music is subordinate to the picture and is prepared or chosen as a pleasing element, or to accentuate the action in the pictures. This invention contemplates a new organization wherein the motion picture is subordinate to descriptive music which has been composed and visualized to represent scenic effects and action, and wherein the motion picture reproduces the varying scenic effects and action visualized by the composer in timed relation with the various cadences, motives, phrases, periods and movements of a musical score. This new organization of motion pictures is particularly adaptable to romantic or emotional music such as composed by Schumann and Chopin, realistic music as composed by Berlioz and Strauss or impressionistic music as composed by Debussy which are vividly descriptive of emotion, events and ideals and their successions and relations. The visionary events and scenes which the composer had in mind have been reproduced to some extent on the stage. Such reproductions, however, are primarily given over to a rendition of the musical scores and many of the more impressive scenic effects are absent. The well known compositions of the aforementioned composers may be taken as an example of music capable of multitudes of beautiful and vivid scenic interpretations, all of which may be reproduced by variably lighted movable portrayals photographed in exact timed relation with the various elements and cadences of the musical scores.

According to this invention, an artist may visualize the scenes of a musical composition from the musical score or from a libretto which presents the composer's visualization of the music, and portray his interpretation upon a plurality of movable transparent sheets arranged to be interposed in successive separated picture planes between a camera and a background. The sheet nearest the camera may be utilized to portray the foreground. A second sheet representing a middle distance and a third sheet representing more distant scenes may be placed behind the first sheet. The portrayals of each sheet when disposed in this manner may be separately lighted. The lighting of each sheet may be altered and colored as required for creating illusions according to the interpretation of the musical thought. As the music progresses from one interpretation to another, the scenic effects may be changed by selectively moving the sheets to form different sectional combinations of the portrayals in exact timed relation with the music. Additional transparent sheets, such as a fourth and fifth sheet, may be introduced between the aforementioned sheets and the background as required. In some cases, to carry out the interpretation of the musical composition, it may be desirable to introduce visionary figures in relief mounted on the transparent sheets, surrounded or partly hidden by a variation of cloud effects moving in front of and behind the relief figures. For other interpretations, it may be desirable to introduce living action in combination with the portrayals accurately positioned with relation to certain parts of the portrayals. By the use of this organization and movement of the portrayals, the scene may be constantly altered to produce natural and visionary effects for musical accompaniment which is only limited by the artist's ability.

It is, therefore, a particular object of this invention to provide a method and means for photographically recording moving pictures as accompaniments to interpretative music by preparing and organizing scenic effects portrayed in part on a limited number of transparent sheets, by separately controlling the lighting effects for each sheet and by selectively moving the separate portrayals as desired to produce a variety of scenic effects and varied scenes in timed relation with the element of the musical score.

The accompanying drawings, in combination with the description thereof, illustrate the preparation and organization of motion pictures according to the invention.

Fig. 1 illustrates the general organization of the portrayals and lights.

Fig. 2 illustrates typical arrangements for moving the portrayals.

Figs. 3 to 10 illustrate methods of preparing and organizing the portrayals and photographs thereof.

One embodiment of the invention contemplates spacing the separate transparent sheets a sufficient distance apart to accommodate individually lighting each sectional portrayal. The positioning of the portrayals in separated picture planes produces the illusion of natural depth in a scene, which effect may be augmented by the control of the lights illuminating particular portrayals. The separation of the transparent sheets further permits the change, addition or elimination of portrayals forming parts of the entire scene, either mechanically or by manipulation of the lights. This embodiment of the invention further contemplates a method of making the separate portrayals accurately according to different scales. The scale of each portrayal is regulated by the distance from each picture plane to the camera lens and the divergence of the light rays between the planes. By this method the scale of the portrayals is larger as the distance becomes greater between the camera lens and the picture plane and all scales are of such proportion that all picture planes or subdivisions thereof subtend the same angle of light rays at the camera lens. The image of the composite scene formed in the camera is thus of a single scale. All objects on a single portrayal are made on the same scale. This does not alter in any way the usual showing of perspective when foreground and distance are required on a single sheet. However, if objects on different portrayals are to appear as though they are in the same perspective plane, the object on the sheet farthest from the lens must be made on a larger scale than the object on the nearer sheet in order that both objects of equivalent perspective subtend the same angle of light at the camera lens.

An organization, according to the foregoing embodiment, is illustrated in Fig. 1 in which the transparent sheets 1, 2, 3, 4, 5 and 6 are spaced a distance apart and are shown successively larger to successively accommodate a larger scale of portrayal. The difference in the size of the portrayals viewed by the camera is indicated by dotted lines 7, 8, 9, 10, 11 and 12. A large number of lights, such as lights 32 to 44, are used to separately illuminate the portrayals. These lights may be of any color desired in order to create the correct illusion or for the purpose of photographically recording the scene in natural colors. Diffusing lights 20 to 31, inclusive, are shown above and below each portrayal which also separately illuminate the various portrayals. These lights are ordinarily arranged with successions of colored lenses, for example, red, white and blue for the oblong lenses A, B and C. This may be repeated throughout the entire lighting structure. The lights, such as 32 to 44, inclusive, may be individually controlled or controlled in groups by rheostats or other well known means of automatically controlling such lights. The camera 50 driven by motor 51 is located a distance from the portrayals, which distance is calculated according to the focal length of the lens in the camera. An improvement in lighting effects was obtained by the use of the tubular member 52 shown between the camera and sheet 1. The outer rays of the light beam reflected from the portrayals to the camera are illustrated by the dotted lines 55, 56, 57 and 58. It is apparent from the lighting arrangement disclosed that various illusions may be obtained in a scene or in the sectional portrayal of a single sheet. By manipulation of the lights or the lights in combination with screens or shades, it is possible to create the illusion of morning light, the light at high noon, the light at sunset, lighting effects during a storm or any lighting effect which is required by the interpretation of the musical score.

The portrayals on sheets 1, 2, 3, 4 and 5 may be simultaneously or selectively positioned before the camera 50 and moved in various directions to alter the scenic effects as a visual accompaniment and interpretation of the elements throughout a musical composition. Sheet 6 is ordinarily used as a background which may also be painted according to the musical reproduction and which may also be moved as the scenic effects are altered. One form of mechanism for moving the sheets in different directions is shown in Fig. 2. The motor 100 is connected by shaft 101 to a set of reduction gears mounted in gear box 102. These gears are connected to a drive shaft 103 for driving clutch members (not shown) which are operably associated with foot pedals 112 to 119 inclusive. The shafts 105 to 111 inclusive terminate in individual gears or clutches (not shown) which are arranged to be selectively driven by shaft 103 through the agency of the first mentioned clutch members. Various well known arrangements may be used for interconnecting the drive shaft 103 with the aforementioned individual shafts 105 to 111. Devices in the form of foot pedals 112 to 119 are shown for causing the aforementioned clutch members or gears to be operably interconnected as desired. It is however within the realm of this invention to operate such mechanism automatically as the music progresses. Any of the shafts 105 to 111 may thus be selectively driven for moving the sheets a desired distance. The sheet 120 is arranged to move in a vertical direction. The shaft 108 drives the gears 124 and 123 for rotating the roller 121 which would move the portrayal downward. This would be particularly desirable for changing from a scene in a valley to a scene on an upper portion of one of the mountains forming the valley. The sheet 125 is arranged for movement in either a horizontal or a vertical direction. In some instances this sheet may be simultaneously moved in both horizontal and vertical directions which gives a slantwise movement to the portrayal on the sheet. Sheet 125 is mounted on rollers 126 and 127 which rollers are mounted in frame 128. The rotation of shaft 109 and roller 127 is controlled through the agency of foot pedal 116 for moving the sheet in a horizontal direction. In this case the roller 127 is equipped with an inside key arranged to slide in keyway 141 when the frame 128 is moved in a vertical direction. The two foot pedals 118 and 119 are associated with clutch or gear members for rotating the shaft 111 in either direction. The shaft 111 drives the gear 132, having gear 131 meshing therewith for driving gear 130 which meshes with the rack 129, integral with frame 128. Pressure on pedal 118 drives frame 128 upward and pressure on pedal 119 drives the frame 128 downward. Sheet 135 may be moved in a horizontal direction by pressure on pedal 117 which causes the interconnection of clutch or gear members in box 104 for rotating shaft 110 and roller 136. It has been found that numerous mechanical structures may be employed for automatically moving the portrayals the required distance. It should, therefore, not be assumed that the invention is limited to the mechanical structure disclosed.

It is apparent that in certain pictorial reproductions the movement of the portrayals must be gauged according to their scale in order that the parts of one portrayal match with the parts of another. For example, let it be assumed that sheets 1 and 5 have an equivalent number of subdivisions or ordinates and that the difference in size of the subdivisions represents the difference in scale of the portrayals and the objects thereon. Sheet 5 must then be moved farther than sheet 1 to change these positions the distance of one subdivision. For this purpose, the gearing arrangement for driving shafts 105 to 111 may be arranged as shown for shaft 105 with the gear ratio between the small and large gears, such as 142 and 143, made according to the scale of the portrayal to be moved. All shafts, such as 144, for regulating the movement of the gears, may thus be driven an equal amount to move any of the sheets different distances, that is, the sheets farther from the camera will be moved a longer distance than the sheets near the camera by the same angular rotation of the lower shaft. The angle of rotation of the lower shafts, such as shaft 144, may be regulated by various well known means for moving the sheets a particular distance. One such means is disclosed in the form of a corrugated collar 138 rigidly connected to shaft 144 and a corrugation counter 139 which is operated by the rotation of the corrugated collar. The collar and counter would be the same for all shafts.

Various methods may be used for synchronizing the progressive changes of the portrayals, the changes in lighting and any existing living action with the various elements of the musical score. The cadence or punctuation points in the musical thought, the motive or single idea unbroken by cadence, the phrase or short musical idea consisting of one or more motives, the period or balanced phrases and the movements or principal divisions of a composition or score will, for the sake of simplicity, be known herein as elements of the musical score. As hereinbefore indicated, the preparation and organization of the portrayals and lighting is planned after a study of the elements of the musical score and possibly a libretto which has been prepared to give the composer's visual pictorial interpretation. A tentative program of the motion picture photography is then made. However, before the photographic work is started, a chart is made of the music to obtain point phase relation between elements of the music and the movement or action in the portrayals and objects to be photographed. The term "point phase" has been chosen to indicate the timed manifestations of scenic and musical effects to the eye and understanding. Very abrupt changes take place in music of the character herein described which, in some instances, follows music of a prolonged similarity of musical thought. The scenic effects are accordingly altered at varying time intervals, which intervals are as abrupt or prolonged as required for the manifestation of the musical expression. One method of procedure comprises making a stop watch record of the music as reproduced from a film or disc to obtain the successive points or cadences in the music which are to be expressed by successive changes in the portrayals, or which are to be expressed by lighting changes or human action. This record will include the exact time between all points in the music to be placed in timed relation with movement or action in the photographs and the starting time for any continued movement or action. Assuming that twenty-four frames of pictures are photographed in one second, the starting time or beat of any action or movement of a portrayal may be calculated and accurately synchronized with the various elements of the musical score. By this method, the photographs of the break of a storm, changes during the continuance of a storm, lightning flashes before thunder or any other sudden changes or rapid action, such as ballet dancing or tap dancing may be accurately timed with the music.

The method of organizing the scale of the various drawings is shown in Figs. 3 to 7, inclusive. The lines subdividing the sheets may or may not be used. One convenient manner of following out this method resides in employing a separate sheet with numerous subdividing lines thereon for indicating the scale of a particular portrayal. An equal number of subdivisions or ordinates is employed for the portrayals of all different scales. The small scale portrayal, Fig. 3, is placed nearest the camera and the others in successive order toward the background 6. By the use of this method, an artist may accurately position objects on any of the sheets, in a desired relation to objects on another sheet regardless of the distance between the sheets. Should it be desired to have particular lines of portrayals, such as 3A, 5A and 6A, coincide in the camera image, they would be identically formed but successively on a larger scale as shown. One part of the portrayal may be painted below line 3A on the sheet, Fig. 3, a second part may be painted in selected relation to the line 5A on the sheet, Fig. 5 and a third part of the portrayal may be painted above or below the line 6A on the sheet, Fig. 6. The lines 3A, 5A and 6A are only given as an example of any comparative lines in the sectional portrayals. To further exemplify the advantages of this method, it may be assumed that an object, such as a mountain cliff with numerous ledges, is portrayed along certain ordinates and proportioned accordingly on the sheet, Fig. 3 nearest the camera. A mountain climber on different ledges of the cliff may be portrayed in properly spaced positions on the sheet, Fig. 4, which sheet, in this instance, is arranged for movement in a horizontal direction. Each movement of the sheet, Fig. 4 may set forth a different view of the mountain climber on the same or a different ledge of the cliff. Since no mountain cliff is painted on the sheet, Fig. 4, the mountain climber must be accurately positioned adjacent equivalent ordinates so as to appear in the camera holding onto, or standing in a particular position on the cliff ledges portrayed on the sheet, Fig. 3. It is thus recognized that the graduated scale is not only used for gauging the size of an image on a particular sheet, but is also used for accurately positioning the object horizontally and vertically, and further for gauging the amount of movement of one sheet for placing an object in a particular relation with an object on another sheet.

It may be desirable in some pictorial interpretations to mount the transparent sheets in frames as shown in Fig. 8. This figure of the drawing illustrates a number of arrangements for producing changes in scenic effects. In this reproduction the mountains, the foreground of the landscape and the river 158 are painted on the sheet 150 which is mounted in the frame 151. The chariot and cloud effects are painted on the sheet 155. A disc 152 arranged to rotate on pivot 161 represents a waterfall. The dotted line 159 represents the outer rays of light in the light beam reflected to the lens of the camera. Thus the portion within the dotted lines should be considered as one scene photographically reproduced. It should, however, be recognized that all parts of this scene may be gradually changed to produce different scenic effects. The frame may be moved by the rotation of gear 160 which meshes with rack 163. The disc 152 supported by pin 161 upon which the waterfall is painted is constantly rotated by the worm gear 154 in mesh with the worm wheel 153. Since the disc is mounted behind the sheet 150, only the right-hand arc above the dotted line is photographed through the sheet 150. A clear space in the portrayal of the landscape is left for the right-hand arc of the waterfall, creating the illusion that the water from the river 158 produces the waterfall. The sheet 155 is supported by pivot pin 162 and arranged to rotate behind sheet 150 through the agency of rack 157 and gear sector 156. The scene disclosed represents the chariot after the sheet 155 has been rotated in an arc, which rotation gradually introduces the chariot into the scene. By further rotation of the sheet 155 the chariot may be gradually moved behind the left-hand mountain and thus out of the scene.

This invention further contemplates the introduction of living actors in scenes requiring this character of interpretation of certain movements of a musical score. One method of introducing living actors in scenes is shown in Fig. 9. In this case a mirror 170 is used as the background for a plurality of portrayals which may be painted in part on sheet 1, 2, 3, 4 or 5. The mirror 170 is adjustably held on rod 171. A second mirror 172 is adjustably held on rod 173. The living actor 175 may dance on a movable platform 174 or any substitute therefor. The actor is positioned a distance from the mirror 172 to obtain the correct size of reflection in mirror 171 to subtend the same angle of light rays to the lens as objects of equivalent perspective. In the portrayal on sheet 1, 2, 3, 4 or 5, a clear space is left for the image of the actor. A scene is painted to produce the proper scenic effect surrounding a landscape or stage upon which the actor may perform. By an adjustment of the mirrors, the actor may be accurately positioned upon the landscape or stage reproduced in the paintings. In this manner the portrayals and living actors, accurately positioned and according to any particular scale, may be combined for photographically producing composite moving pictures.

This invention further contemplates composite moving pictures, such for instance as a combination of moving picture photographs of a plurality of scenic portrayals with moving picture photographs taken of models which may be living figures posed for this purpose. In this case a space on the portrayals is left clear between certain ordinates. This space is consequently in a particular position in each frame of the photograph. The models of living figures in various poses are photographed on another film in exactly the same space that is left clear in the pictures of the portrayals. The models are proportioned according to equivalent ordinates and matched with objects of the portrayals. Figs. 10, 10A, 10B, 10C and 10D illustrate an arrangement for accurately positioning the models of living figures on the film to match the clear space and objects in the moving pictures made of the portrayals. In this organization a camera 202 is used with a lens of the correct focal distance which is suitable to produce an image of a particular size. The model 220 is positioned a distance from the camera calculated according to the focal length of lens in the camera to produce an image of the same proportion as the objects of the portrayals. A screen 200, arranged according to Fig. 10B, is placed immediately in front of the model. The screen 200 is shown representing a quarter section of a picture frame or a quarter section of a portrayal. This screen is divided into ordinates in the same manner as the portrayal and proportionate therewith. Therefore if the model is positioned within or aligned with certain ordinates and the camera focused accordingly, the photograph of the model will be exactly in alignment with particular ordinates of the portrayal and thus in alignment with the clear space left in the photgraph of the portrayal. In order to focus the camera for accurately positioning the model, the view finder on the camera may be subdivided as shown in Fig. 10A. A piece of film or other transparent material may be marked as shown in Fig. 10 and placed inside of the camera as a substitute for the external view finder. Only representative matching points have been shown on the view finder and screen. The ordinates and subdivisions may be made as required. If the model is to appear in the rectangle 6F of the view finder using line 205 as a stage or base, and rectangle 211 of screen 200, the camera is focused so as to bring point K of the view finder into alignment with point 1—P of the screen or point L into alignment with point 2—P. This can be adjusted as required. The focusing of the camera would be the same if the model or action appeared in both space 210 and 211. This, of course, would place the action on a film in the positions occupied by space 5—F and 6—F of the view finder. Assuming that the film space to be occupied is that marked 11—F on the view finder, and the action exists in space 211 of the screen, the point Q of the view finder would be brought into alignment with the point 2—P of the screen. In the foregoing manner, objects photographed on one film may be brought into exact alignment with objects of the portrayals photographed on another film. In the foregoing method of photography, it is the practice to remove the screen shown in Fig. 10B after the camera has been focused. It is also the practice to use a background and stage of black material, such as velvet, to properly outline living models in various poses. A black screen such as screen 203 having a clear space of the proper size for viewing the model or image, may be positioned as shown to eliminate light reflections to the camera from other objects.

In certain instances, it is possible to dispense with the screen 200 with the ordinates thereon. In this case, the screen 203 may be placed a distance from the camera which is approximately the same as the distance from camera 50 to the portrayal having the clear space thereon. In this case, the opening in the screen 203 should be the same scale as the portrayal having the clear space thereon, that is, the same size as the clear space in the portrayal. Any one of the view finder points G to V may then be brought into alignment with the lower left corner of the open space in screen 203. The model is thus placed in the correct position on the film in alignment with the objects on the portrayal. The distance from the camera to the model is calculated according to the focal length of lens in the camera and in accordance with the requirements of maintaining correct perspective relative to the rest of the picture in the same manner as when the screen 200 is used.

In accordance with the above method, one film, such as shown in Fig. 10C, is used for photographing the scenic effects of the portrayals. A second film, such as shown in Fig. 10D, is used for photographing the models or living action in a particular position on the film which will be exactly in alignment with the objects of the portrayals. The two films are then printed together to produce the effect of the living figures appearing in the scene painted upon the transparent materials of the various portrayals. In certain instances, objects, such as a rock, may be painted on one of the portrayals. To produce the desired interpretation of the libretto and musical score, a human form must approach the rock and finally fall prone upon its surface. In order to properly depict scenes of this character, a model of the rock is made of such scale as to exactly match the scale of the rock on the painting. This is done by making the rock the same scale as the scale of ordinates in the screen 200. When the camera is focused by aligning the ordinates of the view finder with the ordinates of the screen 200, the photograph of the model of the rock will be in exact alignment with the photograph of the painting of the rock. When the human actor falls prone upon this rock, this actor is in the exact position as though he had fallen upon the rock painted in the portrayal. It is, therefore, apparent that the use of this method makes it possible to exactly align the objects of two photographs.

While certain novel methods and features of the invention have been shown and described and recited in the annexed claims, it will be understood that substitutions and changes in the methods, forms and details illustrated and in their operation may be made without departing from the spirit of the invention.

What is claimed is:

1. A method of preparing, organizing and recording interpretive music and moving pictures consisting in recording a musical composition which was composed only for expressing musical thought, in portraying a visionary interpretation of the various musical thoughts on a plurality of elongated movable transparent sheets for selective introduction of the various portrayals on each sheet in a restricted area, in moving said sheets longitudinally for successively introducing different portrayals thereon in the space of said restricted area for creating various predetermined combinations in timed relation with certain cadences of the musical score, and in photographically recording motion pictures of the original set-up of portrayals on the plurality of sheets presented in combination in said restricted area and each successive combination as the sheets are moved to present different portrayals.

2. A method of preparing, organizing and recording interpretive music and moving pictures consisting in recording a musical composition which was composed only for expressing musical thought, in portraying a visionary interpretation of the various musical thoughts on a plurality of elongated movable transparent sheets for selective introduction of the various portrayals on each sheet in a restricted area, in interposing sections of the sheets in different perspective planes between a camera and a background in said restricted area, in organizing the portrayals on different scales according to the perspective plane of the sheet as positioned in said restricted area, in moving said sheets longitudinally for successively introducing different portrayals thereon in the space of said restricted area for various predetermined combinations in timed relation with certain cadences of the musical score, and in photographically recording motion pictures of the combinations of portrayals as they appear in said restricted area.

3. A method of preparing, organizing and recording interpretive music and moving pictures consisting in recording a musical composition which was composed only for expressing musical thought, in portraying different parts of a visionary interpretation of the various musical thoughts on a plurality of elongated movable transparent sheets for selective introduction in combinations in a restricted area, in movably mounting said plurality of sheets in different perspective planes between a camera and a background, in moving any sheet a distance corresponding to the perspective plane for introducing different portrayal parts into the restricted area to alter combinations representing different visual events in the musical composition, and in photographically recording moving pictures of different combinations appearing in the restricted area, the number of frames of moving pictures agreeing in each case with the time duration of the different musical thoughts of the composition.

4. A method of preparing, organizing and photographically recording a scene for moving pictures as a visual accompaniment to a musical score consisting in portraying different parts of said scene on each of a plurality of elongated transparent sheets in separated picture planes between a camera and a background, in organizing said portrayals in an equal number of ordinates on a scale commensurate with the distance from the portrayal to the camera lens, to have the various picture planes and subdivisions thereof subtend the same angle of light at the lens, in positioning the sheets to present portrayal parts in combination in a restricted area and in selectively moving any of the sheets longitudinally to present different portrayal parts on said sheets in the restricted area to progressively alter the character of the scenes in organizing the movement of said portrayals according to said subdivisions for matching the objects of said different portrayals in the camera lens, in selectively changing portrayal combinations in point phase with certain cadences of the musical score and in photographically recording motion pictures of the various combinations of portrayals presented in the restricted area in frame count timed relation with the elements of the musical score.

5. A method of photographing a scene as a visual accompaniment to a musical score in which a plurality of separately lighted elongated sheets having portrayals of different scales thereon, representing a plurality of scenic effects, are movably mounted in different perspective planes, according to scale between a moving picture camera and a background, consisting in organizing the longitudinal movements of individual sheets to introduce numerous different combinations of sections of several portrayals on different sheets in a restricted area between the camera and the background in point phase with certain cadences of the musical score, in moving the sheets in the different planes an amount commensurate with the portrayal scale according to said organization, in designating the number of motion picture frames to be photographed of each combination presented in the restricted area, according to said organization, and in photographing the combinations as designated.

6. A method of preparing and organizing scenes for photographic recording, consisting in portraying different parts of different events on each of a plurality of elongated transparent sheets, in interposing a restricted area of a plurality of sheets with portrayals thereon in successive picture planes between a camera and a background, in separating said planes a sufficient distance from each other to facilitate separately lighting the portrayals of each plane, in reserving lengths of the same sheets with other portrayals thereon outside of the restricted area for introduction therein to form varied combinations of portrayals in said restricted area by longitudinal movement of the sheets, in moving said sheets to form said varied combinations of portrayals for depicting a predetermined number of events, and in photographically recording a predetermined number of moving pictures of each event depicted.

7. A method of preparing and organizing scenes for photographic recording consisting in portraying different parts of different scenes on each of a plurality of elongated transparent sheets, in interposing said sheets with portrayals thereon in successive picture planes in a restricted area between a camera and a background, in separating said planes a sufficient distance from each other to facilitate separately lighting the portrayals of each plane, in organizing certain portrayals to be moved in one direction and others to be moved in different directions such as horizontal and vertical directions, in organizing a series of changes to form selected combinations of parts for introduction into said restricted area and in moving said sheets longitudinally in directions according to said organizations for producing various combinations in said restricted area.

8. A method of preparing a series of scenes for photographic recording in which different components of the scenes are portrayed on a number of elongated movable transparent sheets arranged to be positioned in separated planes between a camera and a background consisting in portraying objects of different scales on the sheets in the different planes as components of the series of scenes in organizing the movement of said sheets in proportion to the scale of the objects to form selected combinations of said components in accurate relation with each other, each combination forming an individual scene in a restricted area between the camera and the background and in moving any of the sheets longitudinally for withdrawing components from and introducing others into said restricted area.

9. A method of preparing a scene for photographic recording in which different parts of the scene are portrayed on a number of elongated transparent sheets arranged to be positioned in separated planes between a camera and a background consisting in portraying objects of different scales on the sheets in different planes of such proportion that objects of equivalent perspective in the different planes subtend the same angle of light at the camera lens and in organizing the movement of said sheets in steps, the number of which being equivalent for an equivalent change of portrayals on different sheets and each step being of such length as to be in proportion to the scales of the objects on the sheet moved in order to form selected combinations of said objects in accurate relation with each other.

10. A method of preparing and organizing a series of scenes for recording scenes and objects therein in exact proportion and location on motion picture films, consisting in portraying different components of scenes on a plurality of movable elongated transparent sheets in separated planes between a camera and a background, each component of a scene being of a size to subtend the same angle of light rays at the camera lens, in organizing the components and objects thereof in an equivalent number of ordinates proportioned according to the size of the portrayal components, in moving said sheets to selectively introduce the portrayals and objects on different sections of the sheets into a restricted area in the viewing range of the camera a distance according to the ordinates of the portrayal for selectively matching different combinations of said components, and in designating certain ordinates of a portrayal in particular combinations as a scale of proportion and location for recording either auxiliary or background portrayals in any desired form.

11. A method of preparing a series of scenes for recording motion pictures consisting in portraying components of each scene on a plurality of movable, elongated, transparent sheets, in interposing a restricted area of a plurality of said sheets with portrayals thereon between a camera and a background, in reserving lengths of the same sheets with other portrayals thereon outside of the restricted area for longitudinal movement into the space of the restricted area, and in moving any of said sheets longitudinally in a desired direction to introduce and match components to introduce and form the series of scenes.

12. A method of preparing a series of scenes for recording motion pictures consisting in portraying components of each scene on a plurality of movable, elongated, transparent sheets, in positioning said sheets in separated planes to facilitate free movement thereof, in so proportioning the components of the scenes on different sheets that they may be exactly matched as composites of components to form scenes, in interposing a restricted area of a plurality of sheets with portrayals thereon between a camera and a background, in reserving lengths of the same sheets with other portrayals thereon outside of the restricted area for longitudinal movement in the space of the restricted area, and in moving any of said sheets longitudinally as desired to match different components for forming a series of scenes.

13. A method of preparing a series of scenes for recording motion pictures consisting in portraying components of each scene on a plurality of movable, elongated, transparent sheets, in positioning said sheets in separated planes to facilitate free movement thereof, in organizing the portrayal components accurately on an ordinate basis which is graded in scale according to the distance from the camera to the portrayal sheet, in interposing a restricted area of a plurality of sheets with portrayals thereon between a camera and a background, in reserving lengths of the same sheets with other portrayals thereon outside of the restricted area for longitudinal movement in the space of the restricted area, and in moving the sheets longitudinally according to the portrayal scale for introducing and accurately matching portrayal components to produce said series of scenes.

14. A method of preparing a series of scenes for recording motion pictures consisting in portraying components of each scene on a plurality of movable, elongated, transparent sheets, in positioning said sheets in separated planes to facilitate free movement thereof, in providing separate lighting effects for each portrayal or combinations thereof, in organizing the portrayal components accurately on an ordinate basis which is graded in scale according to the distance from the camera to the portrayal, in interposing a restricted area of a plurality of sheets with portrayals thereon between a camera and a background, in reserving lengths of the same sheets with other portrayals thereon outside of the restricted area for longitudinal movement in the space of the restricted area, and in moving the sheets longitudinally according to the portrayal scale for introducing and accurately matching portrayal components to produce said series of scenes.

15. A method of preparing, organizing and recording interpretive music and motion pictures consisting in recording a score of a musical composition which has been composed only for the purpose of expressing in music the visionary scenes in the composer's mind, in subdividing the recorded score into movements, phrases and groups of phrases within the movements which express visionary effects in said scene, in portraying said visionary scenes and effects on a plurality of movable transparent sheets in such manner that certain sheets may be variably positioned to portray a single musical thought and varying musical thoughts in movements of the score and other sheets may be variably positioned and moved to introduce new effects for combinations to express the various musical thoughts in separate phrases within said movements, in mounting said sheets in spaced relation to facilitate separately lighting the portrayal of each sheet, in moving said sheets longitudinally for introducing different portrayals thereon in numerous combinations in a restricted recording area according to the musical thought expressed, and in photographically recording motion pictures of said various combinations of portrayals which are moved into said restricted area to be reproduced as a visionary accompaniment to said recorded musical score.

16. A method of preparing, organizing and recording interpretive music and motion pictures consisting in recording a score of a musical composition which has been composed only for expressing in music the visionary scenes in a composer's mind, in subdividing the recorded score into movements, phrases and groups of phrases within the movements which express said visionary scenes and portions thereof, in portraying a plurality of scenes and portions thereof on each of a plurality of elongated transparent sheets in such a manner that any of said sheets may be moved longitudinally for imaging any of a plurality of scenic effects thereon in a restricted area before a camera lens, in mounting said sheets in spaced relation to facilitate separately lighting each sheet, in moving a plurality of sheets longitudinally for imaging portrayals on certain portions of the sheets in combinations in the restricted area and for selectively imaging the portrayals of other sections of said sheets in this area for expressing the musical thoughts of movements and phrases of the score, and in photographically recording motion pictures of said various combinations appearing in this area to be synchronously reproduced as a visionary accompaniment to said recorded musical score.

17. A method of preparing, organizing and recording interpretive music and motion pictures, consisting in recording a score of a musical composition which has been composed only for expressing in music the visionary scenes in a composer's mind, in subdividing the recorded score into movements, phrases and groups of phrases within the movements which express said visionary scenes and portions thereof, in portraying a plurality of scenes and portions thereof on each of a plurality of elongated transparent sheets in such a manner that any of said sheets may be moved longitudinally for imaging any of a plurality of scenic effects thereon in combinations in a restricted area before a camera lens, in mounting said sheets in spaced relation to facilitate separately lighting each sheet, in including and excluding the portrayals of certain sheets by lighting effects, in moving said sheets to introduce different sections thereof with portrayals thereon into the restricted recording area for imaging numerous combinations for expressing the different musical thoughts, and in photographically recording motion pictures of said various combinations to be synchronously reproduced as a visionary accompaniment to said recorded musical score.

18. A method of preparing, organizing and recording interpretive music and motion pictures, consisting in recording a score of a musical composition which has been composed only for expressing in music the visionary scenes in a composer's mind, in subdividing the recorded score into movements, phrases and groups of phrases within the movements which express said visionary scenes, in portraying a plurality of scenes and portions thereof on each of a plurality of elongated transparent sheets in such a manner that the scenes on different sections of the various sheets may be imaged before a camera in various combinations by longitudinal movement of the various sheets, in having a restricted section of each sheet before the camera lens, in moving said sheets longitudinally to introduce different restricted sections for varying the combinations of portrayals as desired, and in photographically recording motion pictures of said various combinations to be synchronously reproduced as a visionary accompaniment to said recorded musical score.

19. A method of preparing, organizing and recording interpretive music and motion pictures, consisting in recording a score of a musical composition which has been composed only for expressing in music the visionary scenes in a composer's mind, in portraying a plurality of said visionary scenes and effects on each of a plurality of elongated movable transparent sheets in such manner that various modifications can be effected in combined form within a restricted viewing range of a camera, in moving certain sheets horizontally and other sheets vertically to produce the effect of an angular movement of the portrayals thereon as different sections of the sheets with portrayals thereon are brought into the viewing range of the camera, and in photographically recording motion pictures of said combinations of portrayals to be synchronously reproduced as a visionary accompaniment to said recorded musical score.

20. A method of preparing, organizing and recording interpretive music and motion pictures, consisting in recording a score of a musical composition which has been composed only for expressing in music the visionary scenes in a composer's mind, in portraying a plurality of said visionary scenes and effects on each of a plurality of elongated movable transparent sheets in such manner that panoramic scenic modifications can be effected in combined form in a restricted area before a camera lens by horizontal and vertical longitudinal movement of different sheets to set forth the impression of an angular movement of the scenic effects, in moving said sheets for successively introducing different portrayals thereon in said restricted area, and in photographically recording motion pictures of said various combinations to be synchronously reproduced as a visionary accompaniment to said recorded musical score.

21. A method of preparing, organizing and photographically recording scenes of motion pictures as a visual accompaniment to a musical score, consisting in portraying visionary scenes on a plurality of elongated transparent sheets in different scales depending upon the location of the sheet with respect to the camera, in mounting said sheets between the camera and a background, in moving the sheets longitudinally in measured steps for introducing and accurately matching portrayals in combinations in a restricted area before the camera, the steps for the various sheets differing in measurement according to a ratio of difference established for the difference in scale of the portrayals thereon.

22. An arrangement for producing motion pictures for a visual accompaniment to a musical score which was composed only for the purpose of expressing in music the visionary scenes in the composer's mind, comprising a plurality of elongated transparent sheets, each having portrayed thereon a plurality of scenes and events proportionate in scale to its distance from the camera lens, the scenes on the different sheets being arranged for combination with each other, means associated with each sheet for moving it longitudinally a desired number of steps, and means for automatically regulating the different distances of the steps for the different sheets commensurate with the scale of the portrayal thereon to facilitate matching the portrayals of different sheets to accurately combine said portrayals for the motion pictures thereof.

23. An arrangement for producing motion pictures for a visual accompaniment to a musical score which was composed and recorded only for the purpose of expressing in music the visionary scenes in the composer's mind, comprising a group of paintings on a plurality of movable elongated transparent sheets, the paintings of each sheet being of a different scale, means for mounting said sheets in separated relation between a camera and a background, means for framing restricted sections of said plurality of sheets for photographing the paintings representing progressively the visionary scenes of the movements in a musical score and the phrases within said movements, means for moving any of said sheets longitudinally a desired number of steps for introducing the paintings on different sections of said sheets in said framed area in combinations, means for counting the steps each sheet is moved, and means to automatically regulate the extent of movement of each step of different sheets commensurate with the scale of the portrayal thereon for matching the different scale paintings with each other.

EUGENE F. SAVAGE.